United States Patent
Kim

(10) Patent No.: US 9,063,382 B2
(45) Date of Patent: Jun. 23, 2015

(54) BARRIER PANEL AND THREE DIMENSIONAL IMAGE DISPLAY DEVICE USING THE SAME

(75) Inventor: Do Heon Kim, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 130 days.

(21) Appl. No.: 13/338,368

(22) Filed: Dec. 28, 2011

(65) Prior Publication Data

US 2013/0057539 A1    Mar. 7, 2013

(30) Foreign Application Priority Data

Sep. 2, 2011    (KR) .................. 10-2011-0089284

(51) Int. Cl.
| | | |
|---|---|---|
| G02F 1/1335 | (2006.01) | |
| G02F 1/1343 | (2006.01) | |
| H04N 13/04 | (2006.01) | |
| G02B 27/22 | (2006.01) | |
| G02F 1/29 | (2006.01) | |

(52) U.S. Cl.
CPC ...... *G02F 1/134309* (2013.01); *H04N 13/0409* (2013.01); *H04N 2213/001* (2013.01); *G02B 27/2214* (2013.01); *G02F 1/29* (2013.01)

(58) Field of Classification Search
CPC .................. G02B 27/2214; H04N 13/0409
USPC .......................................................... 349/15
See application file for complete search history.

(56) References Cited

U.S. PATENT DOCUMENTS

| | | | |
|---|---|---|---|
| 5,493,427 A | 2/1996 | Nomura et al. | |
| 6,049,424 A | 4/2000 | Hamagishi | |
| 7,612,833 B2 * | 11/2009 | Kim ................................ | 349/15 |
| 7,675,668 B2 | 3/2010 | Lim | |
| 8,059,063 B2 | 11/2011 | Nam et al. | |
| 2006/0215262 A1 | 9/2006 | Kim | |
| 2007/0046564 A1 | 3/2007 | Kim et al. | |
| 2007/0159566 A1 | 7/2007 | Kang | |
| 2007/0183015 A1 | 8/2007 | Jacobs et al. | |
| 2008/0143895 A1 * | 6/2008 | Peterka et al. ................... | 349/15 |
| 2010/0289870 A1 | 11/2010 | Leister | |
| 2011/0084961 A1 | 4/2011 | Son et al. | |
| 2011/0109622 A1 | 5/2011 | Son et al. | |
| 2011/0157497 A1 * | 6/2011 | Kim ................................ | 349/15 |
| 2011/0175906 A1 * | 7/2011 | Zheng et al. ................... | 345/419 |

FOREIGN PATENT DOCUMENTS

| | | |
|---|---|---|
| CN | 1828364 A | 9/2006 |
| CN | 1924639 A | 3/2007 |
| GB | 2474325 | 4/2011 |
| JP | 63-203088 | 8/1988 |
| KR | 10-20060096844 A | 9/2006 |
| KR | 10-2011-0068596 | 6/2011 |

OTHER PUBLICATIONS

DE Office Action dated May 16, 2012 for corresponding application No. 10 2011 057 102.7.
GB Combined Search and Examination Report dated Apr. 30, 2012 for corresponding application No. GB1122498.7.
Chinese Office Action issued in Chinese Patent Application No. 201110455421.X on Oct. 10, 2014.

* cited by examiner

*Primary Examiner* — Edward Glick
*Assistant Examiner* — Mark Teets
(74) *Attorney, Agent, or Firm* — Morgan, Lewis & Bockius LLP

(57) ABSTRACT

A barrier panel is disclosed which includes: upper and lower substrates opposite to each other; a liquid crystal layer interposed between the upper and lower substrates; a plurality of upper electrodes formed parallel to one another in a direction on the upper substrate; and a plurality of lower electrodes formed on the lower substrate in another direction parallel to the upper electrode, wherein the upper and lower electrodes are alternately disposed.

8 Claims, 7 Drawing Sheets

BARRIER PANEL AND THREE DIMENSIONAL IMAGE DISPLAY DEVICE USING THE SAME

CROSS-REFERENCE TO RELATED APPLICATION

This application claims priority under 35 U.S.C. 119 to Korean Patent Application No. 10-2011-0089284, filed on Sep. 2, 2011, which is hereby incorporated by reference in its entirety.

BACKGROUND

1. Field of the Disclosure

This disclosure relates to a barrier panel as well as a three dimensional image display device including a barrier panel.

2. Description of the Related Art

A variety of methods for implementing a three dimensional image display device using binocular parallax have been proposed in a variety of ways for a long time. One representative method places one of a lenticular lens and a parallax barrier at a fixed distance away from a two dimensional image panel and provides the two eyes of the viewer with images different from each other, thereby allowing the viewer to have a sense of solidity.

A three dimensional image display device including the lenticular lens provides left and right images in a striped shape on a focus surface of each lens of a lenticular lens sheet, which is called a lenticular screen, and makes the left and right images separate from each other by the lenses according to a directivity of the lenticular sheet, so that a viewer can view a three dimensional image without a pair of glasses. The width of a single lenticular lens depends on that of each pixel on the display device. More specifically, the width of a single lenticular lens is set to include two pixels which each correspond to left and right pixels. In this case, a lens effect forces not only a left side pixel of the lenticular lens to be viewed just from the right eye of the viewer but also a right side pixel of the lenticular lens to be viewed just from the left eye of the viewer. In accordance therewith, it becomes possible to separate the left and right images from each other.

Another three dimensional image display device using the parallax barrier arranges vertical slits, which are formed in striped shapes and used to transmit or intercept light, in a fixed interval and enables left and right images to be alternately provided in one of the front or rear directions of the vertical slits at a fixed distance. In accordance therewith, the left and right images are viewed from a fixed viewing point through the vertical slits in such a manner as to be accurately and geometric-optically separate from each other and to make a viewer to have a sense of solidity. In other words, this three dimensional image display device disposes a parallax barrier's optic-plate, which includes striped patterns and functions as special glasses, in the front of a monitor screen so that a viewer can recognize a three dimensional image without the special glasses.

FIG. 1 is a diagram showing a three dimensional image display device which is implemented using a parallax barrier.

Referring to FIG. 1, a three dimensional image display device of the related art includes a liquid crystal panel 11 and a parallax barrier 12 which is disposed in the rear direction of the liquid crystal panel 11 at a fixed distance. The liquid crystal panel 11 is formed to allow left and right image stripes L and R to be alternately arranged with a pixel pitch "P". The parallax barrier 12 is formed to allow transparent and opaque portions 12a and 12b to be not only alternately arranged with each other but also repeated at every barrier pitch "q".

Such a three dimensional image display device enables light from a light source (not shown) to sequentially pass through the transparent portion 12a and the liquid crystal panel 11 and reach both eyes LE and RE of a viewer. More specifically, the lights passed through the right image stripes R reach the right eye RE of the viewer, and the lights passed through the left image stripes L reach the left eye LE of the viewer. In this manner, the left and right images L and R are recognized by both eyes of the viewer, respectively, so that two different two-dimensional-image informations can be input to the viewer. Therefore, the viewer can obtain image information with having a sense of solidity (that is, three dimensional image information).

If the opaque portions 12b of the parallax barrier 12 are processed to become transparent, light emitted from the light source sequentially passes through the parallax barrier 12 and the liquid crystal panel 11 and reaches the viewer. In accordance therewith, the three dimensional image display device can display a two dimension image similar to the ordinarily two-dimensional image display device. In other words, the three dimensional image display device can selectively display the two and three dimensional images by controlling the opaque portions 12b of the parallax barrier 12.

The above-mentioned three dimensional image display device must satisfy conditions necessary to give a viewer a sense of solidity. The necessary conditions can be written as the following equation 1.

$$d = \frac{(2n+1)P(D+d)}{S}, \quad [\text{Equation 1}]$$

$$q = \frac{2P(D+d)}{D}$$

In the equation 1, "n" is a positive integer, "S" is the distance between both eyes of the viewer, and "D" is the shortest distance between the liquid crystal panel and the eyes of a viewer. Also, "d" is the shortest distance between the parallax barrier and the liquid crystal panel, "q" is a barrier pitch of the parallax barrier, and "P" is a pixel pitch of the liquid crystal panel.

FIG. 2 is a diagram showing a parallax barrier of the three dimensional image display device according to the related art.

Referring to FIG. 2, the related art parallax barrier used in the three dimensional image device is schematically shown. The related art parallax barrier includes: an upper substrate on which a common electrode 21 is formed; a lower substrate, opposite to the upper substrate, provided with striped electrodes 22 which are arranged in a fixed barrier pitch; and a power supply unit 23 configured to control the transparent and opaque statuses of a liquid crystal layer between the upper and lower substrates by inducting a re-alignment of the liquid crystal layer. The power supply unit 23 either applies a voltage between the common electrode 21 and the striped electrodes 22 or intercepts the voltage applied between the common electrode 21 and the striped electrodes 22, so that portions of the liquid crystal layer corresponding to the striped electrodes 22 become the transparent or opaque status. In accordance therewith, a three dimensional image or a two dimensional image is displayed.

FIGS. 3 and 4 are diagrams for illustrating problems of a three dimensional image display device using a related art parallax barrier.

As shown in FIG. 3, the three dimensional image display device allows not only left striped images to be viewed from the left eye of a viewer but also right striped images to be viewed from the right eye of the viewer. In this case, the left striped images and the right striped images are synthesized so that the viewer has a sense of solidity for the synthesized image. Meanwhile, if both eyes of the viewer are moved from a position of "R and L" to another position of "R' and L'" as shown in FIG. 4, the striped images are partially shielded. Due to this, a three dimensional image can not be realized. In other word, when both eyes of the viewer are moved from one position of "R and L" to another position of "R' and L'", the parallax barrier must be shifted by a distance of "W" in order to continuously realize the three dimensional image.

However, the parallax barrier included in a three dimensional image display device of the related art must be fixed in position. As such, a visible angular range allowing the viewer to view a three dimensional image must be limited within left and right angles of about 5°.

BRIEF SUMMARY

Accordingly, the present embodiments are directed to a barrier panel that substantially obviates one or more of problems due to the limitations and disadvantages of the related art, and a three dimensional image display device including the same.

Embodiments of the present disclosure are to provide a barrier panel capable of being finely controlled.

Also, embodiments of the present disclosure are to provide a three dimensional image display device which includes a barrier panel capable of being finely controlled.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a barrier panel includes: upper and lower substrates opposite to each other; a liquid crystal layer interposed between the upper and lower substrates; a plurality of upper electrodes formed parallel to one another in a direction on the upper substrate; and a plurality of lower electrodes formed on the lower substrate in another direction parallel to the upper electrode, wherein the upper and lower electrodes are alternately disposed.

An LCD device according to another general aspect of the present embodiment includes: a display panel configured to display an image; a measuring portion mounted to the display panel and configured to measure a position of the eye of a viewer; a controller configured to determine the operation status of a barrier panel on the basis of the position of the eye of the viewer measured by the measuring portion and generate a control signal; and a driver configured to reply to the control signal and drive the barrier panel. The barrier panel includes: upper and lower substrates opposite to each other; a liquid crystal layer interposed between the upper and lower substrates; a plurality of upper electrodes formed parallel to one another in a direction on the upper substrate; and a plurality of lower electrodes formed on the lower substrate in another direction parallel to the upper electrode and arranged to be alternately disposed with the plurality of upper electrodes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
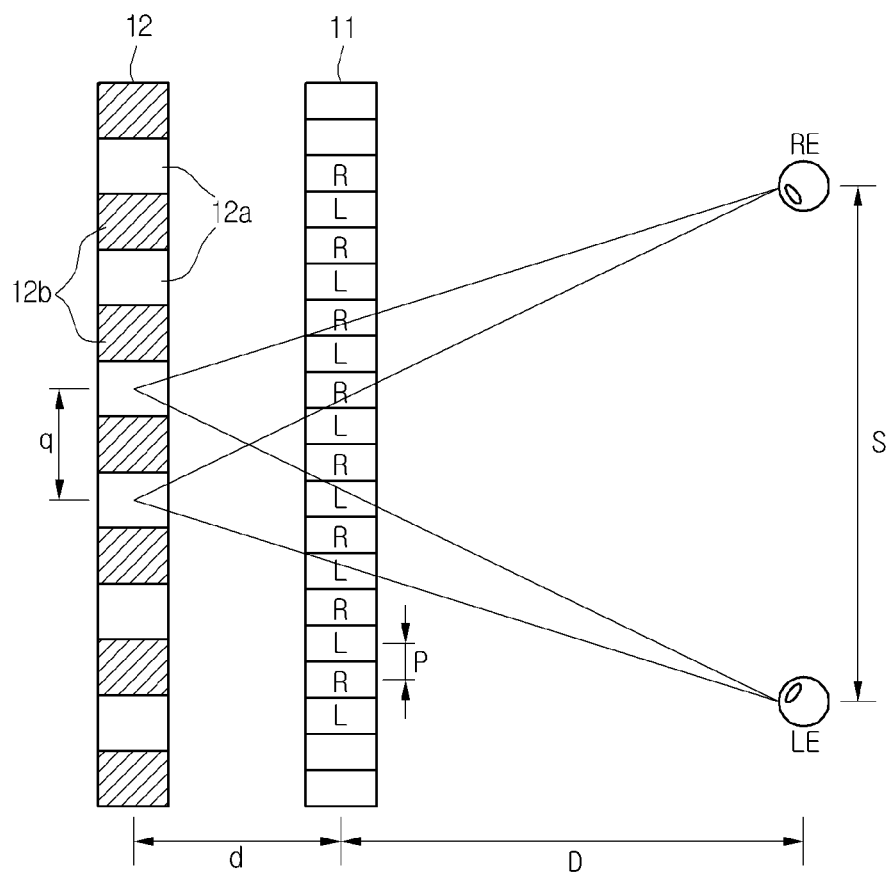
FIG. 1 is a diagram showing a three dimensional image display device which is implemented using a parallax barrier.
Figure 2:
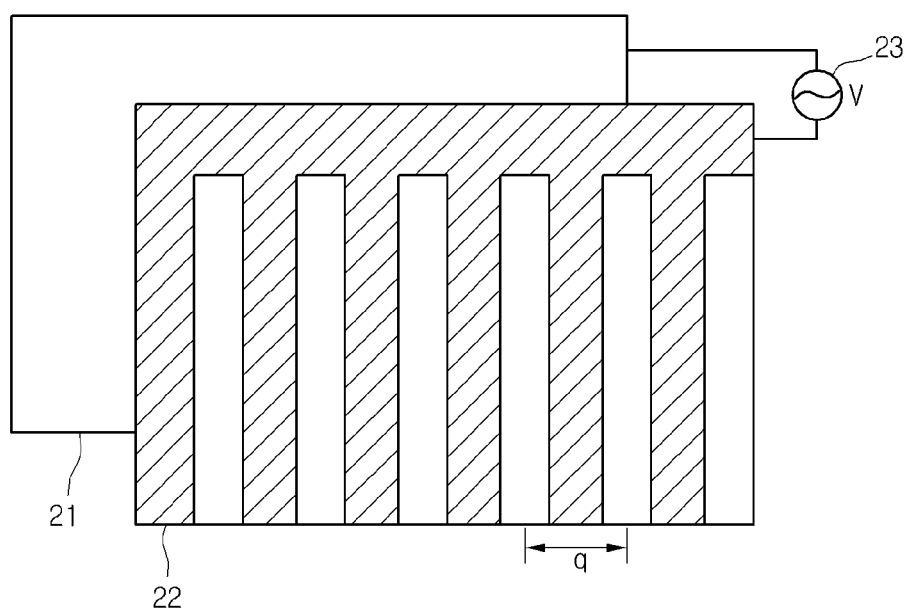
FIG. 2 is a diagram showing a parallax barrier of a three dimensional image display device according to the related art.
Figure 3:
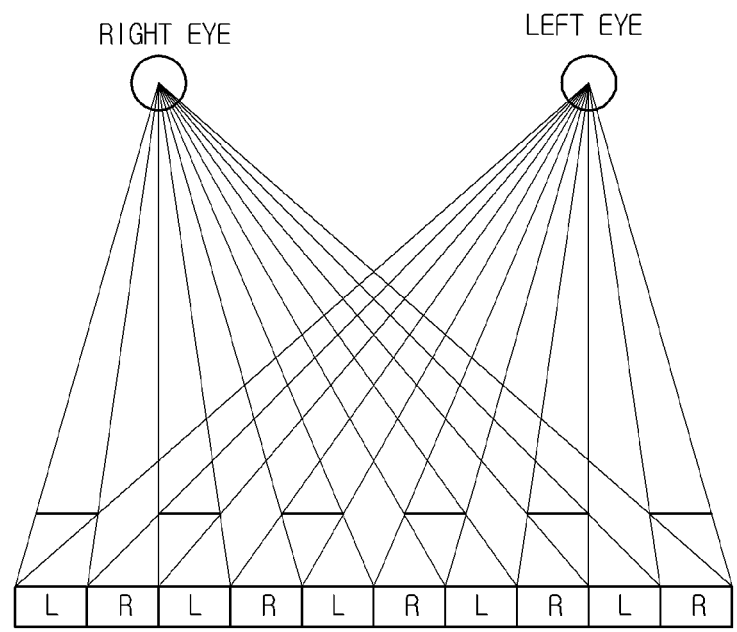
FIGS. 3 and 4 are diagrams for illustrating problems of a three dimensional image display device using a related art parallax barrier.
Figure 4:
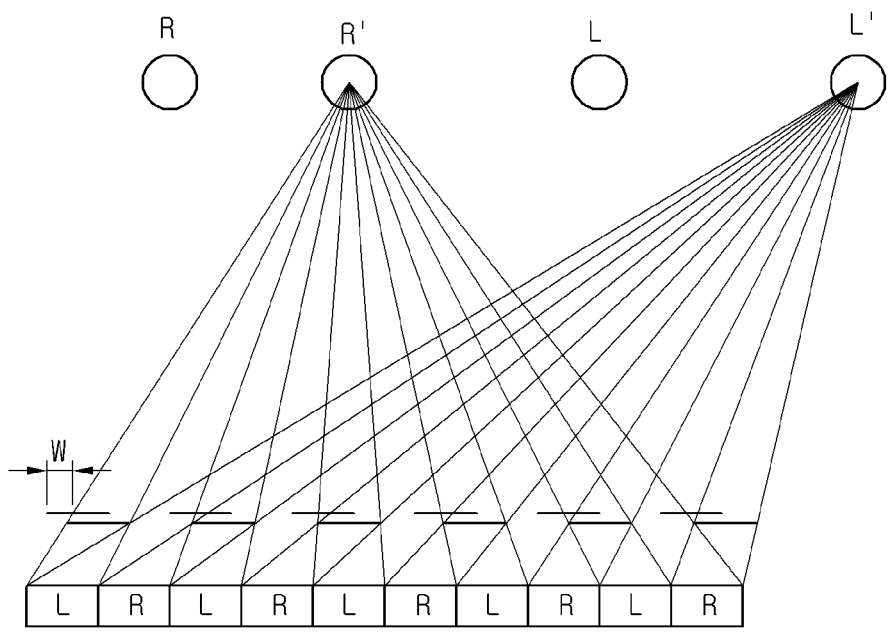

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 5:
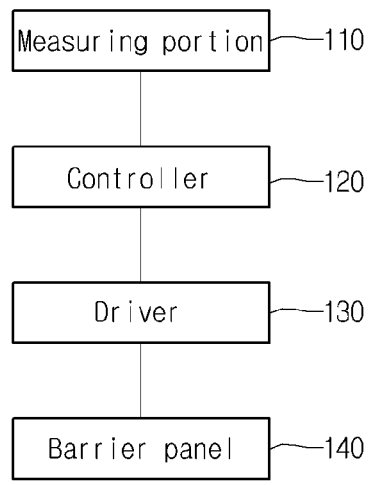
FIG. 5 is a block diagram showing a barrier unit of a three dimensional image display device according to an embodiment of the present disclosure.

FIG. 5 is a block diagram showing a barrier unit of a three dimensional image display device according to an embodiment of the present disclosure.

Referring to FIG. 5, the barrier unit of a three dimensional image display device according to an embodiment of the present disclosure includes a measuring portion 110, a controller 120, a driver 130 and a barrier panel 140.

The measuring portion 110 functions to measure positions for the left and right eyes of a viewer who uses a display device. Alternatively, the measuring portion 110 can collect real-time images for the face of a viewer who uses a display device. To this end, the measuring portion 110 can become a camera mounted to a liquid crystal panel (not shown). Alternatively, the measuring portion 110 can become a separate sensor. The measured positions for the left and right eyes of the viewer or the collected real-time images for the face of the viewer are transferred from the measuring portion 110 to the controller 120.

The controller 120 functions to control the barrier panel 140 using either the positions of the left and right eyes of the viewer or the real-time image of the face of the viewer, which are transferred from the measuring portion 110. If the real-time image for the face of the viewer is received from the measuring portion 110, the controller 120 extracts the positions of the eyes of the viewer from the received real-time image. Moreover, when the data transferred from the measuring portion 110 indicates that the positions of the eyes of the viewer are shifted, the controller 120 supplies the driver 130 with a control signal which is used for controlling the barrier panel 140 to a status suitable for a viewing angle of the viewer.

The driver 130 functions to drive the barrier panel 140 on the basis of the control signal which is transferred from the controller 120. This driver 130 can be configured with a plurality of drive chips. The driver 130 for the barrier panel 140 drives only rows unlike a driver for a liquid crystal display panel. As such, a scan signal is not required for the driver used to drive the barrier panel 140. The driver 130 selectively applies a voltage the rows on the barrier panel 140 and enables the rows on the barrier panel 140 to be selectively activated (or turned-on or off), in order to adjust a barrier pitch of the barrier panel 140. Therefore, the barrier panel 140 is driven to meet the positions of the eyes of the viewer.

The barrier panel 140 is partially activated (or turned-on/off) by the voltage applied from the driver 130 and forms barriers. In accordance therewith, a three dimensional image can be realized.

Figure 6:
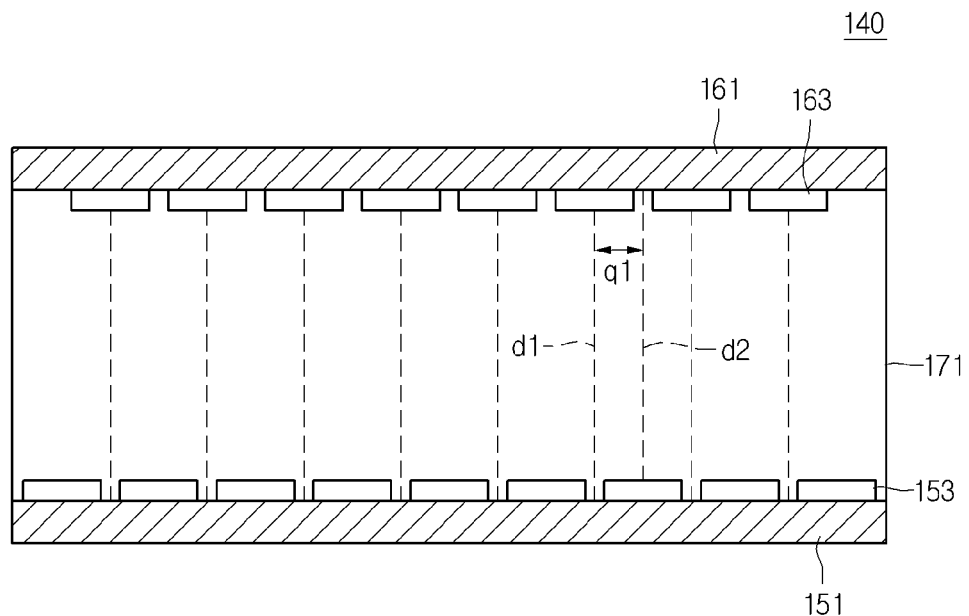
FIG. 6 is a cross-sectional view showing a barrier panel according to an embodiment of the present disclosure.

FIG. 6 is a cross-sectional view showing a barrier panel 140 according to an embodiment of the present disclosure.

Referring FIG. 6, the barrier panel 140 according to an embodiment of the present disclosure includes lower and upper substrates 151 and 161 opposite to each other, and a liquid crystal layer 171 interposed between the lower and upper substrates 151 and 161.

A plurality of lower electrodes 153 can be formed on the lower substrate 151. The plurality of lower electrodes 153 can be formed to extend along a vertical direction and have a fixed gap. The smaller the fixed gap between the lower electrodes 153 becomes, the easier the displacement control of liquid crystal in the liquid crystal layer 171 becomes. Meanwhile, the fixed gap between the lower electrodes 153 must maintain enough distance to prevent electrical contact between the lower electrodes which is caused by a process error. The plurality of lower electrodes 153 is independently driven. Such lower electrodes 153 can be formed from a transparent conductive material. For example, the lower electrodes 153 can be formed from one of indium-tin-oxide (ITO), indium-zinc-oxide (IZO) and indium-tin-zinc-oxide (ITZO).

A plurality of upper electrodes 163 can be formed on the upper substrate 161. The plurality of upper electrodes 163 can be formed to extend along a direction parallel to the lower electrode 153 and have a fixed gap. The upper electrodes 163 can be formed in the same width as the lower electrode 153. The plurality of upper electrodes 163 can be arranged to have the same gap as the lower electrodes.

When the lower and upper electrodes 153 and 163 are projected from above, they can be alternately arranged with each other. In other words, the center lines of the lower electrodes 153 and the center lines of the upper electrodes 163 can alternate with each other. As such, a first perpendicular line d1 progressing from a position between the adjacent lower electrodes 153 toward the upper substrate 161 can reach the surface of an opposite upper electrode 163. Similarly, a second perpendicular line d2 progressing from a position between the adjacent upper electrodes 163 toward the lower substrate 151 can reach the surface of an opposite lower electrode 153. More specifically, the first perpendicular line d1 can be projected at the center of the opposite upper electrode 163. Also, the second perpendicular line d2 can be projected at the center of the opposite lower electrode 153.

Such lower and upper electrodes 153 and 163 can be used to control the liquid crystal molecular displacement in the liquid crystal layer 171.

The liquid crystal layer 171 can be formed from one of a TN (twisted nematic) mode liquid crystal material and a VA (vertical alignment) mode liquid crystal material. If the barrier panel 140 is implemented in a normally white mode, a three dimensional image display device applies voltages between the lower and upper electrodes 153 and 163 which are positioned at a portion requiring a barrier, and enables an electric field to be formed between both electrodes by a potential difference. Then, the electric field causes a liquid crystal molecular displacement and forces a barrier to be generated. In this case, a barrier pitch q1 from which the barrier can be formed can depend upon the distance between the first and second perpendicular lines d1 and d2. The barrier pitch q1 can have a half size compared to that in the related art barrier panel, because the lower and upper electrodes 153 and 163 are alternately disposed each other. As such, the barrier can be finely shifted and made more suitable for the positions of the eyes of a user. In accordance therewith, a natural three dimensional image can be realized. Moreover, picture quality of the three dimensional image can be enhanced because it is possible to smoothly and continuously shift the barrier.

Figure 7:
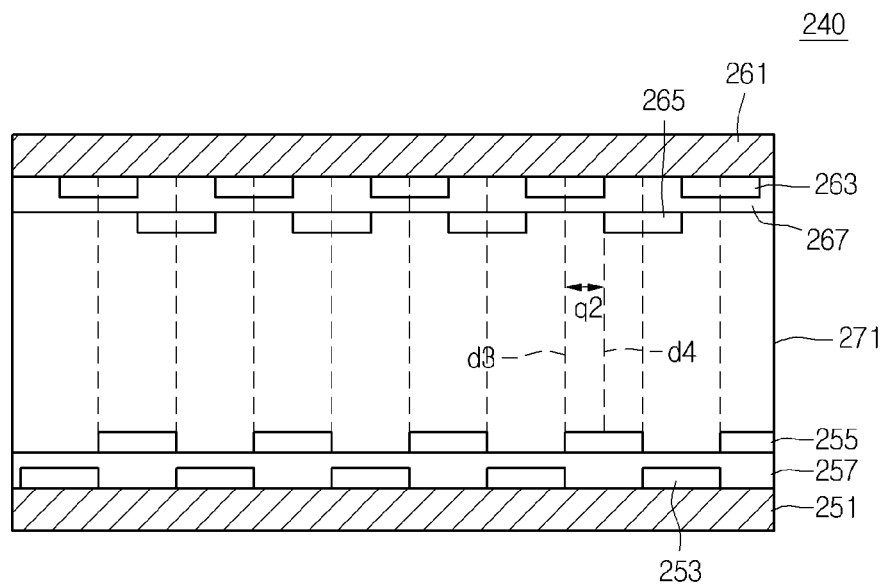
FIG. 7 is a cross-sectional view showing a barrier panel according to another embodiment of the present disclosure.

FIG. 7 is a cross-sectional view showing a barrier panel 240 according to another embodiment of the present disclosure.

The barrier panel 240 according to another embodiment of the present disclosure has the same configuration as that according to an embodiment, except for that upper and lower electrodes are formed in two layers. As such, the detailed description of one embodiment to be repeated in another embodiment of the present disclosure will be omitted.

Referring to FIG. 7, the barrier panel 240 according to another embodiment of the present disclosure includes lower and upper substrates 251 and 261 opposite to each other, and a liquid crystal layer 271 interposed between the lower and upper substrates 251 and 261.

A plurality of first lower electrodes 253 can be formed on the lower substrate 251. The plurality of first lower electrodes can be formed to have a fixed width. The plurality of first lower electrodes 253 can be formed with a fixed gap between them. The width of each first lower electrode 253 can be the same as the fixed gap between the first lower electrodes 253.

A first insulation layer 257 can be formed on the lower substrate 251 provided with the first lower electrodes 253. The first insulation layer 257 is used to prevent an electrical connection of the first lower electrode with a second lower electrode 255 which will be formed on the first insulation layer 257. To this end, the first insulation layer 257 can be formed from a material with insulation characteristics. For example, the first insulation layer 257 can include either an inorganic material such as silicon nitride, silicon oxide or others, or an organic material such as BCB (benzocyclobutene) or others.

A plurality of second lower electrodes 255 can be formed on the first insulation layer 257. The plurality of second lower electrodes 255 can be formed to have a fixed width. The width of each second lower electrode 255 is the same size as not only the gap between the second lower electrodes 255 but also that of the first lower electrode 253. As such, the second lower electrodes 255 can be formed above the gaps between the first lower electrodes 253. In other words, a third perpendicular line d3 can be formed to progress along one edges of the first and second lower electrodes 253 and 255 adjacent to each other.

Similarly, a plurality of first upper electrodes 263 can be formed on the upper substrate 261. A second insulation layer 267 can be formed on the upper substrate 261 provided with the first upper electrodes 263. Moreover, a plurality of second upper electrodes 265 can be formed on the second insulation layer 267.

The first and second upper electrodes can be formed to have the same width. The gap between the first upper electrodes 263 is the same size as that between the second upper electrodes 265. Also, the first and second upper electrodes 263 and 265 can be formed in the same width as not only a gap between the first upper electrodes 263 and another gap between the second upper electrodes 265. As such, the second upper electrode 265 can be formed on the second insulation opposite to the gap region between the first upper electrodes 263. In other words, a fourth perpendicular line d4 can be formed to progress along one edges of the first and second upper electrodes 263 and 265 adjacent to each other.

The third perpendicular line d3 can reach the surface of the first or second upper electrode 263 or 265. More specifically, the third perpendicular line d3 can correspond to the center of the first or second upper electrode 263 or 265. Similarly, the fourth perpendicular line d4 can reach the surface of the first or second lower electrode 253 or 255. In other words, the fourth perpendicular line d4 can correspond to the center of the first or second lower electrode 253 or 255.

The first and second lower electrodes 253 and 255 and the first and second upper electrodes 263 and 265 can be formed from a transparent conductive material. For example, the first and second lower electrodes 253 and 255 and the first and second upper electrodes 263 and 265 can be formed from one of indium-tin-oxide (ITO), indium-zinc-oxide (IZO) and indium-tin-zinc-oxide (ITZO).

The pluralities of the first lower electrodes 253, second lower electrodes 255, first upper electrodes 263 and second upper electrodes 265 can partially reply to differently set voltages and can enable barriers to be generated. In the barrier panel 240, a barrier pitch q2 can become a distance between the third and fourth perpendicular lines d3 and d4. The barrier pitch q2 can be halved in size compared to the related art's barrier panel, because the first and second lower electrodes 253 and 255 are alternately disposed with the first and second upper electrodes 263 and 265. As such, the barrier can be finely shifted and made more suitable for the positions of the eyes of a user. In accordance therewith, a natural three dimensional image can be realized. Moreover, picture quality of the three dimensional image can be enhanced because it is possible to smoothly and continuously shift the barrier.

The first and second lower electrodes 253 and 255 and the first and second upper electrodes 263 and 265 formed in the different layers from one another can allow an electric field to be applied throughout the liquid crystal layer 271. As such, the entire liquid crystal layer 271 can be used to form a barrier. Actually, the barrier panel 140 according to one embodiment has to maintain the gaps for preventing any electrical contact between the electrodes. Meanwhile, the barrier panel 240 according to another embodiment can allow the electrodes to form throughout the liquid crystal layer when it is projected in a vertical direction. This results from the fact that the electrodes are dividedly formed in the different layers. As such, light leakage in the barrier panel can be reduced. Therefore, picture quality can be enhanced.

Such barrier panels 140 and 240 according to embodiments of the present disclosure can be disposed in not only the front direction but also the rear direction of a display panel which is used to display images. The barrier panels 140 and 240 enable left and right images on the display panel to be properly viewed from the left and right eyes of a viewer, thereby realizing a three dimensional image.

Figure 8A:
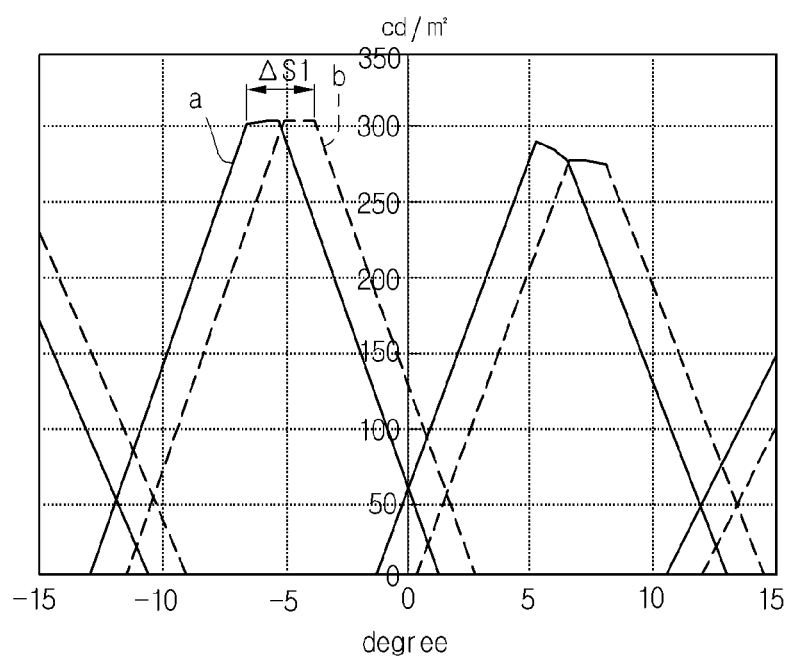
FIGS. 8A and 8B are graph-based diagrams illustrating brightness with respect to a viewing angle.
Figure 8B:
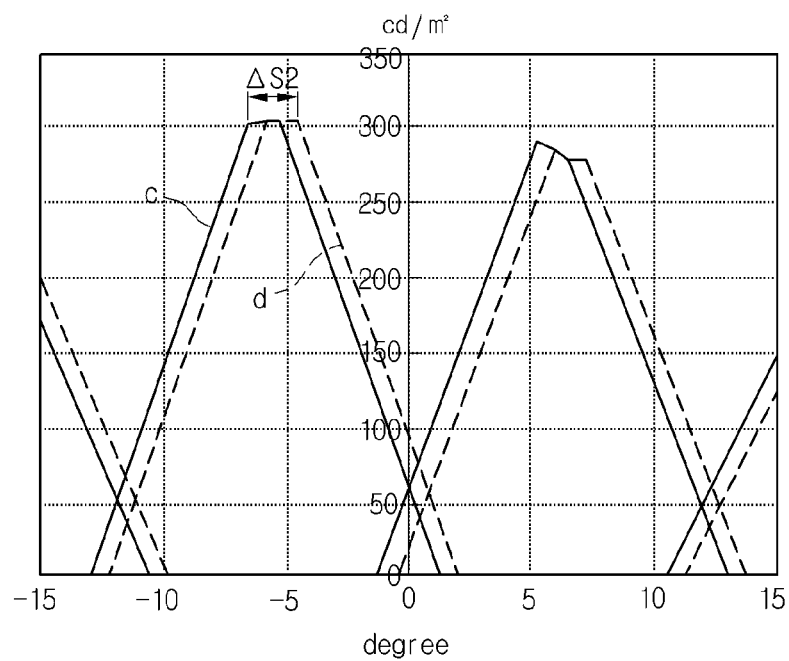

FIGS. 8A and 8B are graph-based diagrams illustrating brightness with respect to a viewing angle.

FIG. 8A is a graph-based diagram illustrating a brightness characteristic of a barrier panel in which an upper electrode is formed in a single layer structure throughout the upper substrate instead of the upper electrodes in the barrier panel of the second embodiment. FIG. 8B is a graph-based diagram illustrating a brightness characteristic of the barrier panel 240 according to the second embodiment.

In FIG. 8A, a first solid line graph "a" represents a brightness characteristic at initial positions of a viewer's eyes, and a second dotted line graph "b" represents a brightness characteristic after the barriers are shifted by one barrier pitch according to the movement of both eyes of the viewer. As seen in FIG. 8A, it is evident that the brightness characteristic graph is shifted by a first viewing angle of $\Delta S1$ when the barriers are shifted by one barrier pitch.

In FIG. 8B, a first solid line graph "c" represents a brightness characteristic at initial positions of the viewer's eyes, and a second dotted line graph "d" represents a brightness characteristic after the barriers are shifted by one barrier pitch according to the movement of both eyes of the viewer. As seen in FIG. 8B, it is evident that the brightness characteristic graph is shifted by a second viewing angle of $\Delta S2$ when the barriers are shifted by one barrier pitch.

As shown in FIGS. 8A and 8B, the second viewing angle of $\Delta S2$ corresponds to only a half of the second viewing angle of $\Delta S1$. As such, it is possible to finely shift the barriers with respect to the movement of the eyes of the viewer. In other words, the barrier can be made more suitable for the positions of the eyes of a user. Therefore, a natural three dimensional image can be realized. Moreover, picture quality of the three dimensional image can be enhanced because it is possible to smoothly and continuously shift the barrier.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A barrier panel comprising:
upper and lower substrates opposite to each other;
a liquid crystal layer interposed between the upper and lower substrates;
a plurality of upper electrodes formed parallel to one another in a direction on the upper substrate; and
a plurality of lower electrodes formed on the lower substrate parallel to the upper electrodes,
wherein the upper and lower electrodes are alternately disposed,
wherein a line perpendicular to the upper substrate extends from either a gap between adjacent upper electrodes or collinear edges of adjacent upper electrodes; and
the perpendicular line reaches a center of the lower electrode, wherein any one of the plurality of lower electrodes overlaps with any two adjacent ones of the plurality of upper electrodes in a direction perpendicular to the upper and lower substrates;

wherein any one of the plurality of upper electrodes overlaps with any two adjacent ones of the plurality of lower electrodes in a direction perpendicular to the upper and lower substrates;

wherein the upper and lower electrodes are formed to have the same width;

wherein the plurality of upper electrodes includes pluralities of first upper electrodes and second upper electrode which are formed layers different from each other, parallel to one another in a direction on the upper substrate, and wherein the plurality of lower electrodes includes pluralities of first lower electrodes and second lower electrode which are formed layers different from each other, parallel to one another in a direction on the lower substrate.

2. The barrier panel claimed as claim 1, wherein the upper and lower electrodes are formed from a transparent conductive material.

3. The barrier panel claimed as claim 1, further comprises insulation layers formed between the first and second lower electrodes and between the first and second upper electrodes.

4. The barrier panel claimed as claim 1, wherein the second lower electrodes are formed in a region opposite to gaps between the plurality of first lower electrodes.

5. A three dimensional image display device comprising:
a display panel configured to display an image;
a measuring portion mounted to the display panel and configured to measure a position of the eye of a viewer;
a barrier panel disposed in the rear or front directions of the display panel;
a driver configured to drive the barrier panel; and
a controller configured to control the driver on the basis of the position of the eye of the viewer measured by the measuring portion, wherein the barrier panel includes:
upper and lower substrates opposite to each other;
a liquid crystal layer interposed between the upper and lower substrates;
a plurality of upper electrodes formed parallel to one another in a direction on the upper substrate; and
a plurality of lower electrodes formed on the lower substrate which lie in the same direction as the upper electrodes and are parallel to the upper electrodes and disposed alternately with the plurality of upper electrodes, wherein a line perpendicular to the upper substrate extends from either a gap between immediately adjacent upper electrodes or collinear edges of immediately adjacent upper electrodes; and the line reaches a center of a lower electrode, wherein the upper and lower electrodes are formed to have the same width, wherein the plurality of upper electrodes includes pluralities of first upper electrodes and second upper electrode which are formed layers different from each other, parallel to one another in a direction on the upper substrate, and wherein the plurality of lower electrodes includes pluralities of first lower electrodes and second lower electrode which are formed layers different from each other, parallel to one another in a direction on the lower substrate.

6. The three dimensional image display device claimed as claim 5, wherein the upper and lower electrodes are formed from a transparent conductive material.

7. The three dimensional image display device claimed as claim 5, further comprises insulation layers formed between the first and second lower electrodes and between the first and second upper electrodes.

8. The three dimensional image display device claimed as claim 5, wherein the second lower electrodes are formed in a region opposite to gaps between the plurality of first lower electrodes.

* * * * *